(12) United States Patent
Pi (10) Patent No.: US 8,403,349 B2
(45) Date of Patent: Mar. 26, 2013

(54) HAND/FOOT POWERED BICYCLE

(76) Inventor: Ching-Tien Pi, Taipei (TW)

( * ) Notice: Subject to any disclaimer, the term of this patent is extended or adjusted under 35 U.S.C. 154(b) by 51 days.

(21) Appl. No.: 13/073,315

(22) Filed: Mar. 28, 2011

(65) Prior Publication Data

US 2011/0241305 A1 Oct. 6, 2011

(30) Foreign Application Priority Data

Mar. 30, 2010 (TW) .............................. 99109508 A (51) Int. Cl.
*B62M 1/12* (2006.01)
(52) U.S. Cl. ........................................................ 280/234
(58) Field of Classification Search .................. 280/230, 280/233, 234
See application file for complete search history.

(56) References Cited

U.S. PATENT DOCUMENTS

| 582,315 | A | * | 5/1897 | Quinn | 280/234 |
| 632,797 | A | * | 9/1899 | Van Horn | 280/234 |
| 641,926 | A | * | 1/1900 | Bollinger | 280/234 |
| 4,502,705 | A | * | 3/1985 | Weaver | 280/231 |
| 4,685,692 | A | * | 8/1987 | Fullilove et al. | 280/234 |
| 4,726,600 | A | * | 2/1988 | Wu | 280/234 |
| 5,082,302 | A | * | 1/1992 | Nacar | 280/234 |
| 5,785,336 | A | * | 7/1998 | Jang | 280/234 |
| 8,181,977 | B1 | * | 5/2012 | Bartlett | 280/233 |

\* cited by examiner

*Primary Examiner* — Kevin Hurley
(74) *Attorney, Agent, or Firm* — Muncy, Geissler, Olds & Lowe, PLLC (57) ABSTRACT

A hand/foot powered bicycle includes a pedal power mechanism as a power source for driving the bicycle. A user can pedal a first pedal and a second pedal with both feet to drive a front sprocket. Via a first chain, the front sprocket drives and rotates the rear wheel. The hand/foot powered bicycle further includes a handlebar power mechanism having a handlebar structure as a power source for driving the bicycle. The hand/foot powered bicycle further includes a power transmission assembly for transmitting power to the front sprocket of the bicycle to drive and rotate the front sprocket. By means of continuously rotating the handlebar structure, the power transmission assembly is driven to transmit power to the front sprocket to drive and rotate the rear wheel via the first chain. A user can drive and make the hand/foot powered bicycle advance with hands and/or feet.

8 Claims, 8 Drawing Sheets

HAND/FOOT POWERED BICYCLE

BACKGROUND OF THE INVENTION

1. Field of the Invention

The present invention relates generally to a hand/foot powered bicycle, and more particularly to a hand/foot powered bicycle, which can be driven to advance with hands and/or feet.

2. Description of the Related Art

A conventional bicycle includes a frame body, a handlebar positioned at a front end of the frame body, a front wheel and a rear wheel for supporting the frame body, a front sprocket, a rear sprocket connected to the front sprocket, and a chain connected between the front and rear sprockets. A rider can pedal the pedals with his/her feet to drive the front sprocket. The chain will drive the rear sprocket to rotate and make the bicycle advance. The rider can turn the handlebar left and right to change the direction of the front wheel so as to control the moving direction of the bicycle.

In modern life, most of the people rely on vehicles for transportation and are insufficient in exercise. In the case that people alternatively ride bicycles instead, an exercising and fitness effect can be achieved. Moreover, the concept of environmental protection has been widely publicized via all kinds of media and energy saving and carbon reduction have become a trend nowadays. Therefore, bicycles have been more and more respected. To catch up with the trend, more and more people have taken bicycles as their transportation tools. With respect to how a bicycle is driven, generally the bicycle is driven by a rider's feet. Therefore, only the feet and legs of the rider are exercised, while the hands and arms of the rider can be hardly exercised.

SUMMARY OF THE INVENTION

It is therefore a primary object of the present invention to provide a hand/foot powered bicycle. A user can rotate a handlebar structure with hands and/or pedal a first pedal and a second pedal with feet to drive a front sprocket. Via a first chain, the front sprocket drives and rotates the rear wheel. Accordingly, the user can drive the hand/foot powered bicycle with his/her hands and/or feet to make the bicycle advance and exercise his/her hands and/or feet.

It is a further object of the present invention to provide the above hand/foot powered bicycle, which can be used as a transportation tool, an exercising implement or a rehabilitation implement.

To achieve the above and other objects, the hand/foot powered bicycle of the present invention includes a handlebar structure as a power source for driving the bicycle and a power transmission assembly for transmitting power to the front sprocket of the bicycle to drive and rotate the front sprocket. By means of continuously rotating the handlebar structure, the front sprocket of the bicycle is driven to drive and rotate the rear wheel via a first chain so as to make the hand/foot powered bicycle advance.

The handlebar structure is connected with a connection head of a telescopic front tube of the bicycle frame body. The handlebar structure has a first crank, a second crank and a locking structure for locating and hindering the first and second cranks from rotating. The handlebar structure further includes a locating structure positioned between the first and second cranks. By means of the locating structure, the second crank can be rotated from a suspended position to a lifted position.

The present invention can be best understood through the following description and accompanying drawings, wherein:

DETAILED DESCRIPTION OF THE PREFERRED EMBODIMENTS

Please refer to FIGS. 1 to 4. The hand/foot powered bicycle of the present invention includes a frame body 10 having a telescopic front tube 50 for adjusting the height of the frame body. An arch-shaped connection head 51 is disposed at a top end of the telescopic front tube 50. The present invention further includes a front wheel 11 and a rear wheel 12 for supporting the frame body 10. The present invention further includes a rear sprocket 16 connected on a rotary shaft 14 of the rear wheel 12. The present invention further includes a pedal power mechanism 15 positioned under the frame body 10. The pedal power mechanism 15 has a front sprocket 13 mounted on a crankshaft 17, a first pedal 18a and a second pedal 18b mounted at the ends of the crankshaft 17, and a first chain 19 connected to the front and rear sprockets 13, 16. The present invention further includes a handlebar power mechanism 20. The first and second pedals 18a, 18b of the present invention can be pedaled by a rider's feet in a conventional manner to drive the front sprocket 13. Via the first chain 19, the rear sprocket 12 is driven and rotated to make the bicycle advance.

The handlebar power mechanism 20 of the present invention also serves as a power source for driving the bicycle. The handlebar power mechanism 20 includes a handlebar structure 21 and a power transmission assembly 30. The handlebar structure 21 has a first crank 22 and a second crank 23, which are symmetrically directed downward. The front end of the first crank 22 has a tubular end section 24 connected with the second crank 23. The first and second cranks 22, 23 are rotatably connected with a sleeve 52 of the connection head 51. The first and second cranks 22, 23 can be located by means of a locking structure 40 without possibility of rotation. The handlebar structure 21 further includes two handles 25 360-degree rotatably connected with the rear ends of the first and second cranks 22, 23. One or both of the handles 25 are provided with a brake lever 29 for synchronously controlling braking of the front and rear wheels. By means of turning the handlebar structure 21, the direction of the front wheel 11 can be changed to control the moving direction of the bicycle.

Figure 1:
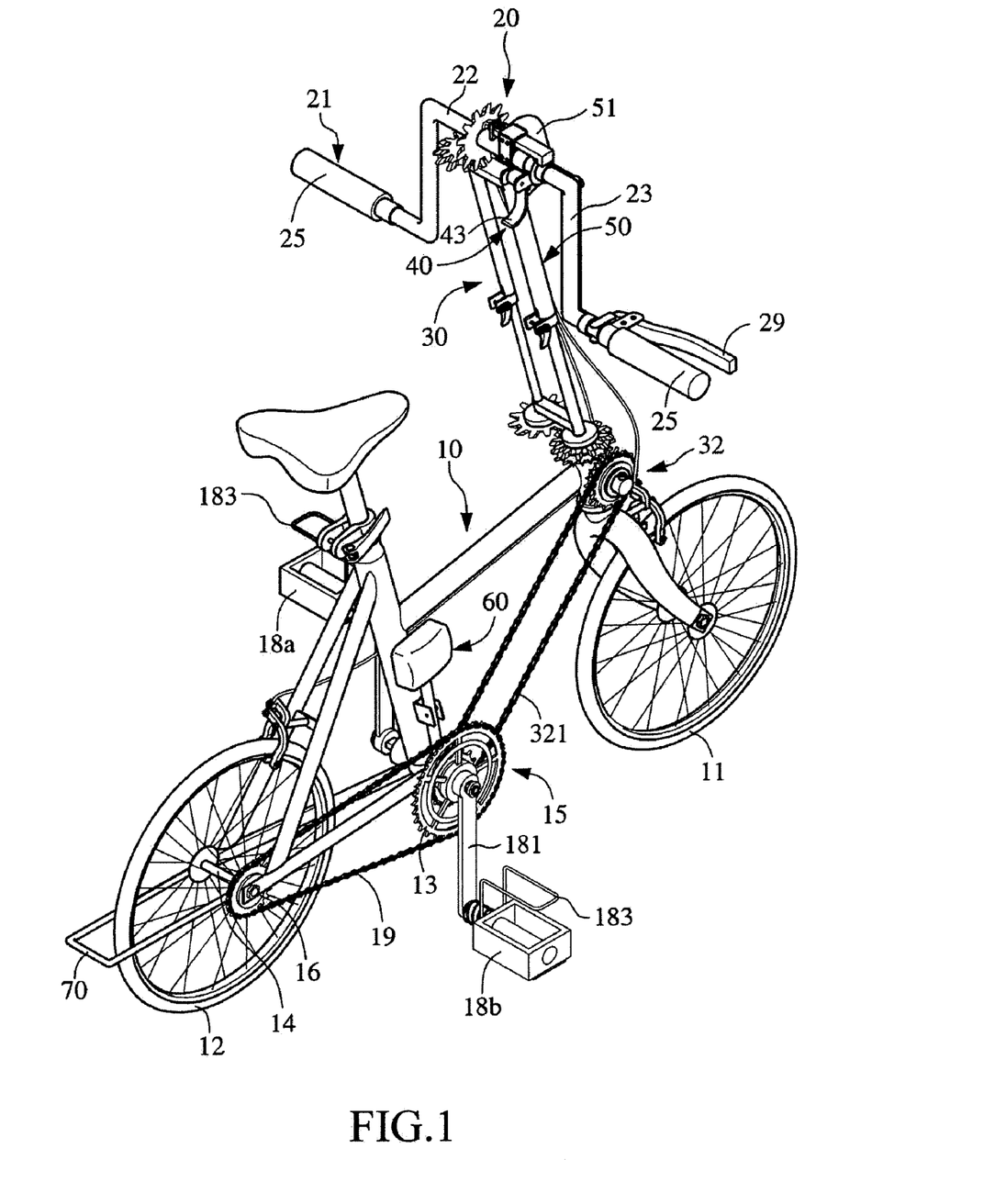
FIG. 1 is a perspective assembled view of the hand/foot powered bicycle of the present invention.
Figure 2:
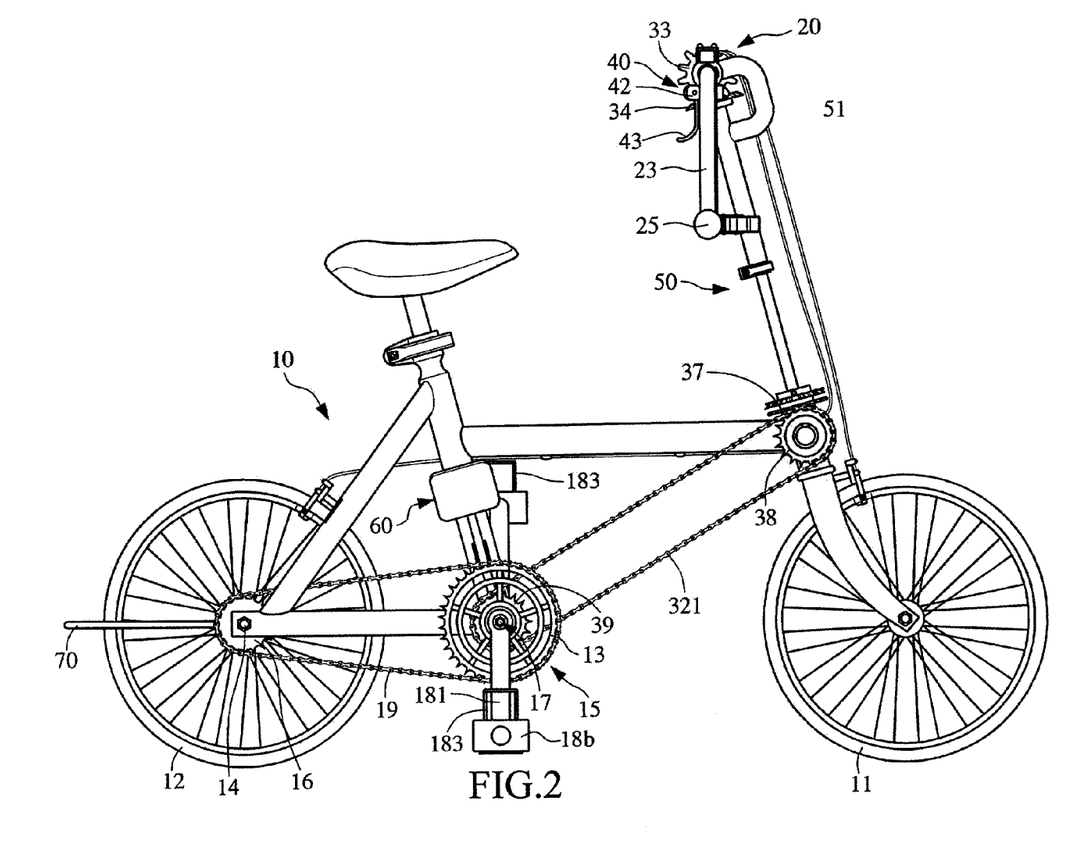
FIGS. 2 and 3 are right view and front view of the hand/foot powered bicycle of the present invention respectively.
Figure 3:
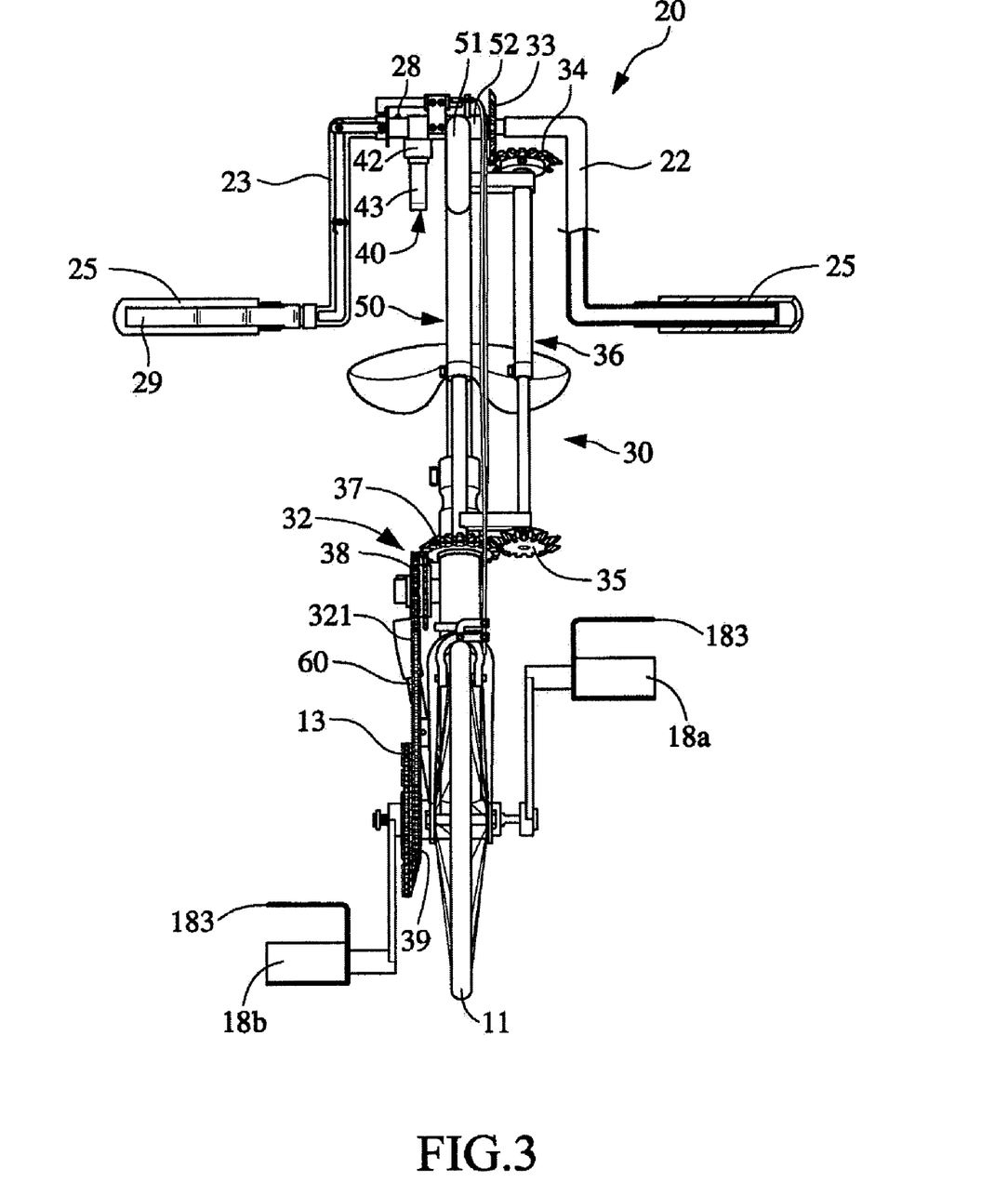
Figure 6:
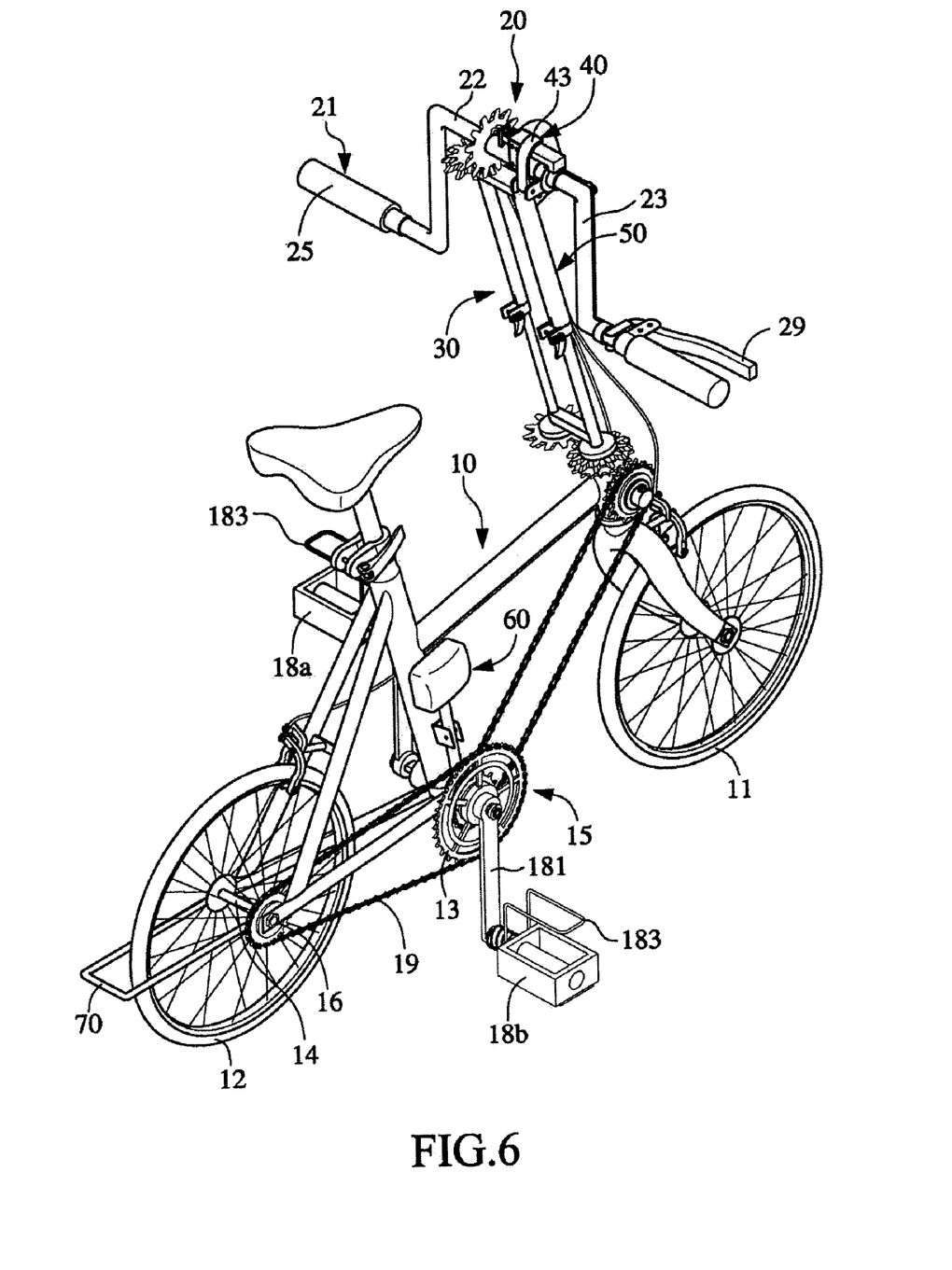
FIG. 6 is a perspective assembled view of the hand/foot powered bicycle of the present invention, in which the cam lever is lifted from an unlocked position to lock and hinder the handlebar structure from being continuously rotated.

The locking structure 40 has an open clip 41, a U-shaped seat 42 and a cam lever 43. The open clip 41 is connected with a rear end of the sleeve 52 of the connection head 51. The tubular end section 24 of the first crank 22 is passed through the open clip 41 and securely held with the second crank 23. A front tongue plate 44 and a rear tongue plate 45 downward extend from the open clip 41 to attach to inner wall face of the U-shaped seat 42. The front and rear tongue plates 44, 45 define therebetween a space. The cam lever 43 contacts with the front tongue plate 44. A pivot shaft is inserted into the U-shaped seat 42 and the cam lever 43, whereby the cam lever 43 can be rotated about the pivot shaft. When the cam lever 43 is levered up from an unlocked position (as shown in FIG. 1) about the pivot shaft (as shown in FIG. 6), the front tongue plate 44 is forcedly moved inward into tight contact with the tubular end section 24 of the first crank 22. Under such circumstance, the first and second cranks 22, 23 are fixed and hindered from rotating. At this time, the first and second pedals 18a, 18b can be pedaled by a rider's feet in a conventional manner to drive the front sprocket 13 and make the bicycle advance.

The power transmission assembly 30 includes a first transmission unit 31 and a second transmission unit 32. The first transmission unit 31 includes: a drive sprocket 33 affixed to the tubular end section 24 of the first crank 22; a first driven sprocket 34 engaged with the drive sprocket 33; a second driven sprocket 35; a telescopic transmission tube 36 positioned between the first and second driven sprockets 34, 35, the telescopic transmission tube 36 being adjustable to a necessary height equal to that of the telescopic front tube 50 of the frame body 10; and a middle sprocket 37 positioned at a bottom end of the telescopic front tube 50 and engaged with the second driven sprocket 35. When rotating the handlebar structure 21, the drive sprocket 33 is driven and rotated to drive and rotate the first driven sprocket 34. By means of the telescopic transmission tube 36, the second driven sprocket 35 is synchronously rotated with the first driven sprocket 34. The second driven sprocket 35 serves to transmit power to the middle sprocket 37. In practice, the middle sprocket 37 is a double-row sprocket one row of which is a flywheel.

The second transmission unit 32 includes: a first sprocket 38 drivable by the middle sprocket 37; a second sprocket 39 engaged with the front sprocket 13 and coaxially installed on the crankshaft 17; and a second chain 321 connected with the first and second sprockets 38, 39. The first sprocket 38 can be rotated to drive and rotate the second sprocket 39 via the second chain 321. The second sprocket 39 can drive and rotate the front sprocket 13, which transmits power to the rear wheel 12 via the first sprocket 19 to make the bicycle advance. In practice, the handlebar structure 21 serves as a power source for driving the bicycle. The handlebar power mechanism 20 is able to transmit power to the front sprocket 13 so as to drive the front sprocket 13 for making the bicycle advance. Accordingly, by means of continuously rotating the handlebar structure 21, the handlebar power mechanism 20 can truly transmit the power to the front sprocket 13. Via the first chain 19, the rear wheel 12 is driven and rotated to make the bicycle advance. Therefore, selectively, the bicycle can be driven to advance by hands and/or feet to exercise a rider's legs and arms. In practice, the first sprocket 38 is a double-row sprocket one row of which is a flywheel, while the second sprocket 39 is a single-row sprocket.

Figure 4:
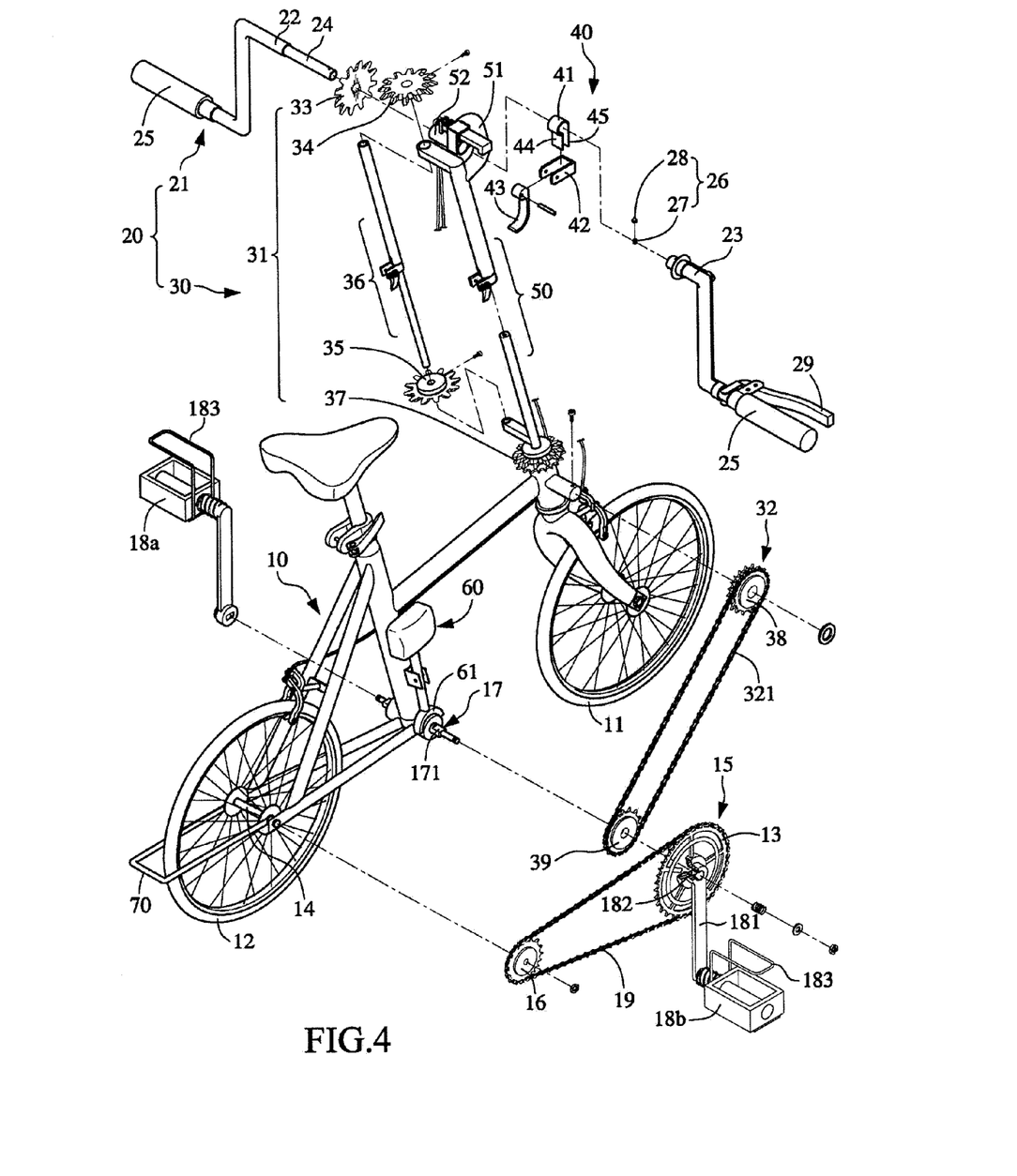
FIG. 4 is a perspective exploded view of the hand/foot powered bicycle of the present invention.
Figure 5:
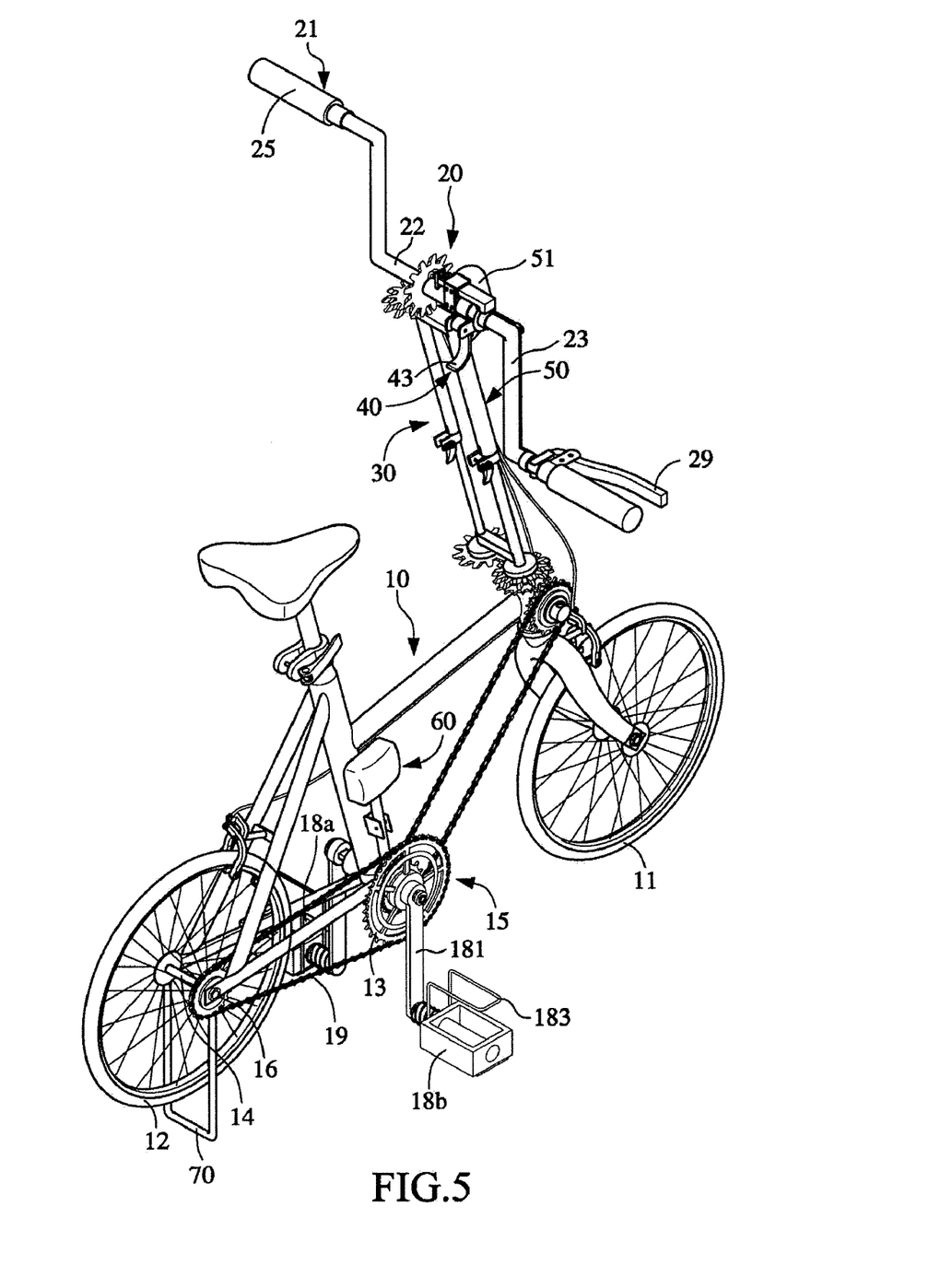
FIG. 5 is a perspective assembled view of the hand/foot powered bicycle of the present invention, in which the first and second cranks of the handlebar structure are one-up and one-down positioned and the bicycle is supported on the stand.

By means of a locating structure 26, the first crank 22 or second crank 23 can be moved from a lowered position (FIG. 1) to a lifted position (FIG. 5). As shown in FIG. 4, the locating structure 26 includes a spring 27 disposed in the tubular end section 24 and a pushbutton 28, which can pass through perforations of the tubular end section 24 and the second crank 23. The pushbutton 28 can be pressed down to allow free rotation of the second crank 23 until the pushbutton 28 passes through the other perforations of the tubular end section 24 and the second crank 23, whereby the second crank 23 is located. At this time, the first and second cranks 22, 23 are positioned in the lifted and lowered positions respectively. Under such circumstance, the bicycle can be supported on the stand 70 to serve as an exercise or rehabilitation implement as shown in FIG. 5. When a user rides on the bicycle, the user can continuously rotate the handlebar structure 21 with both hands and cooperatively pedal the first and second pedals 18a, 18b with both feet to achieve double exercising effect.

Figure 7:
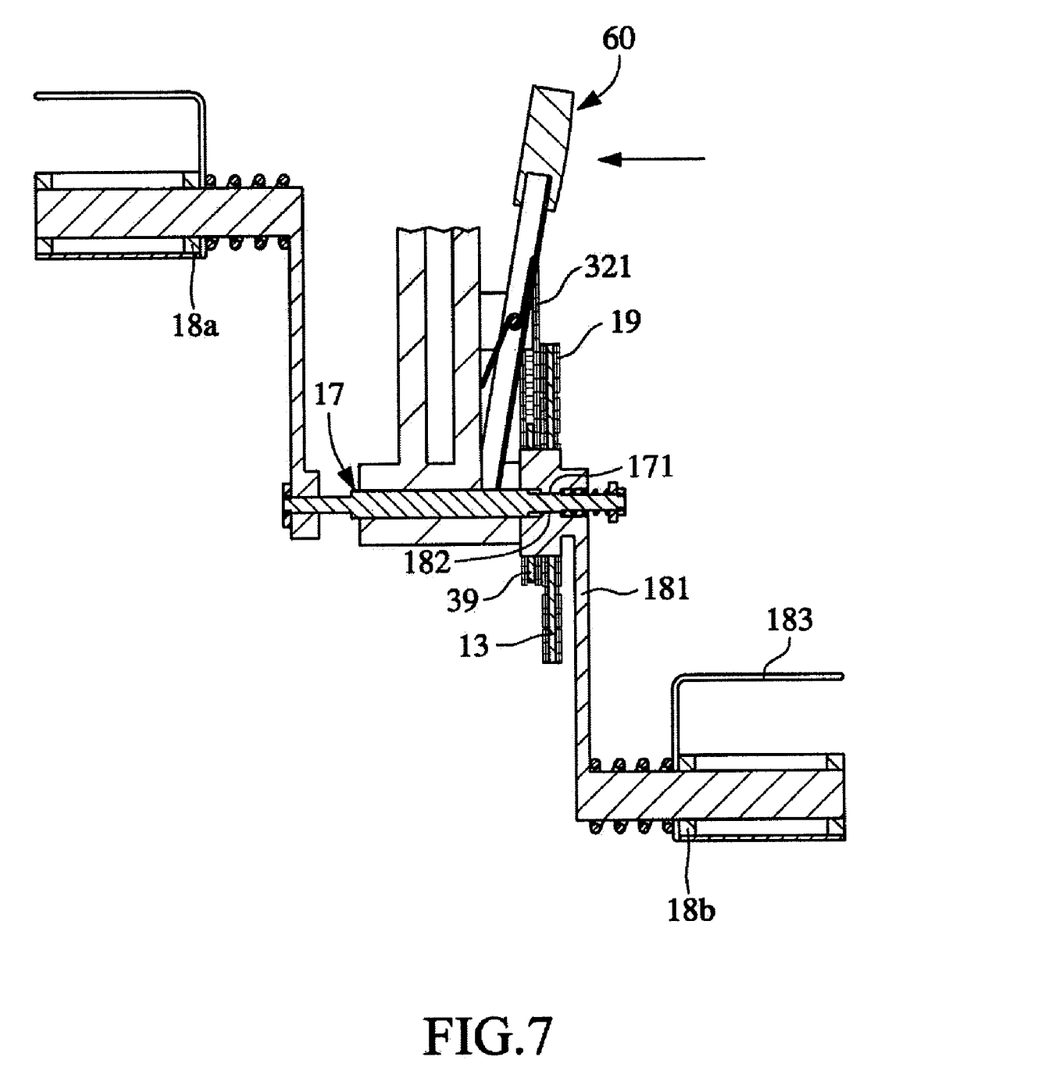
FIG. 7 is a sectional view of the hand/foot powered bicycle of the present invention, in which by means of leverage, the push member pushes the second sprocket and the crank outward to make the rectangular section of the crankshaft extracted out of the rectangular hole of the crank.
Figure 8:
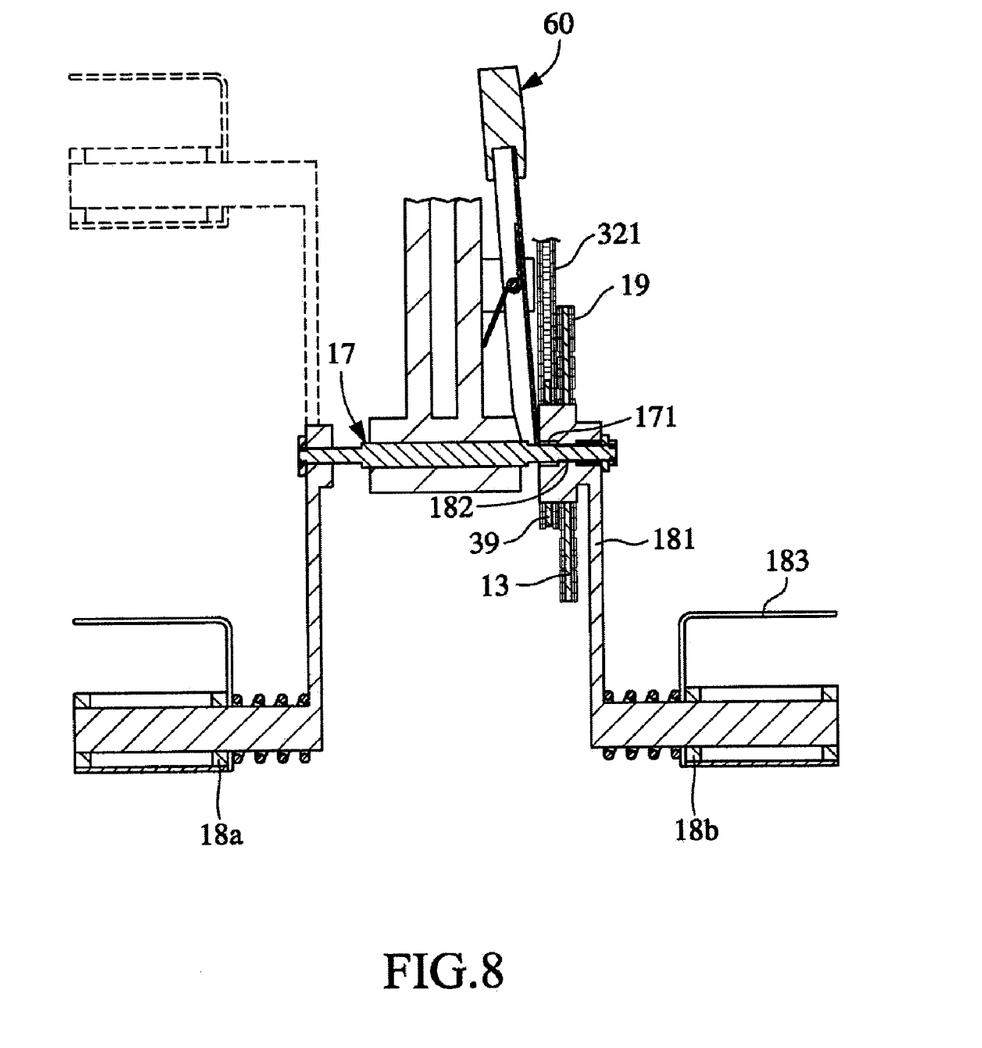
FIG. 8 is a sectional view according to FIG. 7, in which the first pedal of the present invention is moved from an upper position (as shown by the phantom line) to a suspended position.

In addition, when used as an exercise or rehabilitation implement, the installation of the first and second pedals 18a, 18b of the present invention can be adjusted from the one-up and one-down mode as shown in FIG. 7 to a both-down mode as shown in FIG. 8. The hand/foot powered bicycle of the present invention further includes a push member 60. The bottom section of the push member 60 has an arcuate section 61 positioned on the crankshaft 17 and on the inner side of a crank 181 (as shown in FIG. 4). By means of leverage, when an inward force is applied to an upper end section of the push member 60, a lower end section of the push member 60 is outward lifted. The lower end section of the push member 60 is restorable to its home position by means of a spring. When the upper end section of the push member 60 is pushed inward, the arcuate section 61 is lifted to push the second sprocket 39 and a crank 181 outward until a rectangular section 171 of the crankshaft 17 is extracted out of a rectangular hole 182 of the crank 181 (as shown in FIG. 8). At this time, the first pedal 18a is released into a naturally suspended position with a height equal to that of the second pedal 18b. When the push member 60 is released from the push force, the crank 181 is restored to its home position, whereby the crank 181 is again drivingly connected with the crankshaft 17. In practice, each of the first and second pedals 18a, 18b is provided with a lifting structure 183. A user's feet are positioned between the first and second pedals 18a, 18b and the lifting structures 183. Accordingly, the user not only can pedal the first and second pedals 18a, 18b with both feet, but also can raise both feet to lift the first and second pedals 18a, 18b so as to exercise and shape the belly of the user.

The above embodiments are only used to illustrate the present invention, not intended to limit the scope thereof. Many modifications of the above embodiments can be made without departing from the spirit of the present invention.

What is claimed is:

1. A hand/foot powered bicycle comprising:
  a frame body having a telescopic front tube, a connection head being disposed at a top end of the telescopic front tube, the connection head having a sleeve;
  a front wheel and a rear wheel for supporting the frame body;
  a rear sprocket connected on a rotary shaft of the rear wheel;
  a pedal power mechanism positioned under the frame body as a power source for driving the bicycle, the pedal power mechanism having a front sprocket mounted on a crankshaft, a first pedal and a second pedal mounted at the ends of the crankshaft, and a first chain connected to the front and rear sprockets, whereby the first and second pedals can be pedaled by a user's feet to drive the front sprocket, via the first chain, the rear sprocket being driven and rotated to make the bicycle advance; and a handlebar power mechanism including a handlebar structure and a power transmission assembly, the handlebar structure having a first crank and a second crank, a front end of the first crank having a tubular end section inserted through the sleeve of the connection head and extending out of the sleeve by a certain length to connect with the second crank, the first crank being rotatably connected with the sleeve, the power transmission assembly including a first transmission unit, a middle sprocket positioned at a bottom end of the telescopic front tube and a second transmission unit, when rotating the handlebar structure, the first transmission unit being driven to transmit power to the middle sprocket, which in turn transmits the power to the second transmission unit, the second transmission unit eventually transmitting the power to the front sprocket of the pedal power mechanism, whereby by means of continuously rotating the handlebar structure, the power transmission assembly transmits power to the front sprocket of the bicycle to drive the rear wheel via the first chain and make the bicycle advance, wherein the first transmission unit includes a drive sprocket affixed to the tubular end section of the first crank; a first driven sprocket engaged with the drive sprocket; a second driven sprocket; a telescopic transmission tube positioned between the first and second driven sprockets; and a middle sprocket positioned at a bottom end of the telescopic front tube and engaged with the second driven sprocket, whereby when rotating the handlebar structure, the drive sprocket is driven and rotated to drive and rotate the first driven sprocket, the second driven sprocket being synchronously rotated with the first driven sprocket via the telescopic transmission tube to transmit power to the middle sprocket.

2. The hand/foot powered bicycle as claimed in claim 1, wherein the handlebar structure has a locking structure for locating and hindering the first and second cranks from rotating.

3. The hand/foot powered bicycle as claimed in claim 2, wherein the locking structure has an open clip connected with a rear end of the sleeve of the connection head, the tubular end section of the first crank being inserted through the open clip to connect with the second crank, the locking structure further having a cam lever for contracting the open clip into tight contact with the tubular end section of the first crank or loosening the open clip from the tubular end section.

4. The hand/foot powered bicycle as claimed in claim 3, wherein the open clip has a front tongue plate and a rear tongue plate downward extending from the open clip, the front and rear tongue plates being positioned in a U-shaped retainer seat, the cam lever contacting with the front tongue plate, a pivot shaft being inserted into the retainer seat and the cam lever, whereby the cam lever can be rotated about the pivot shaft, when the cam lever is pressed down, the diameter of the open clip being reduced to force the open clip into tight contact with the tubular end section and thus connect the open clip with the tubular end section.

5. The hand/foot powered bicycle as claimed in claim 1, wherein the second transmission unit includes: a first sprocket drivable by the middle sprocket; a second sprocket engaged with the front sprocket and coaxially installed on the crankshaft; and a second chain connected with the first and second sprockets, whereby the first sprocket can be rotated to drive and rotate the second sprocket via the second chain, the second sprocket driving and rotating the front sprocket, which transmits power to the rear wheel via the first chain to make the bicycle advance.

6. The hand/foot powered bicycle as claimed in claim 1, wherein the handlebar structure further includes a locating structure positioned at a connection section between the first and second cranks, whereby the second crank can be freely rotated to one-up and one-down position the first and second cranks.

7. The hand/foot powered bicycle as claimed in claim 6, wherein the locating structure includes a spring disposed in the tubular end section of the first crank and a pushbutton, which can pass through the tubular end section and the second crank, whereby the pushbutton can be pressed down to allow free rotation of the second crank until the pushbutton reaches a predetermined position and is located.

8. The hand/foot powered bicycle as claimed in claim 6, wherein each of the first and second pedals is provided with a lifting structure, whereby a user's feet can be positioned between the first and second pedals and the lifting structures to synchronously lift and pedal the first and second pedals.

* * * * *